UNITED STATES PATENT OFFICE 2,083,250

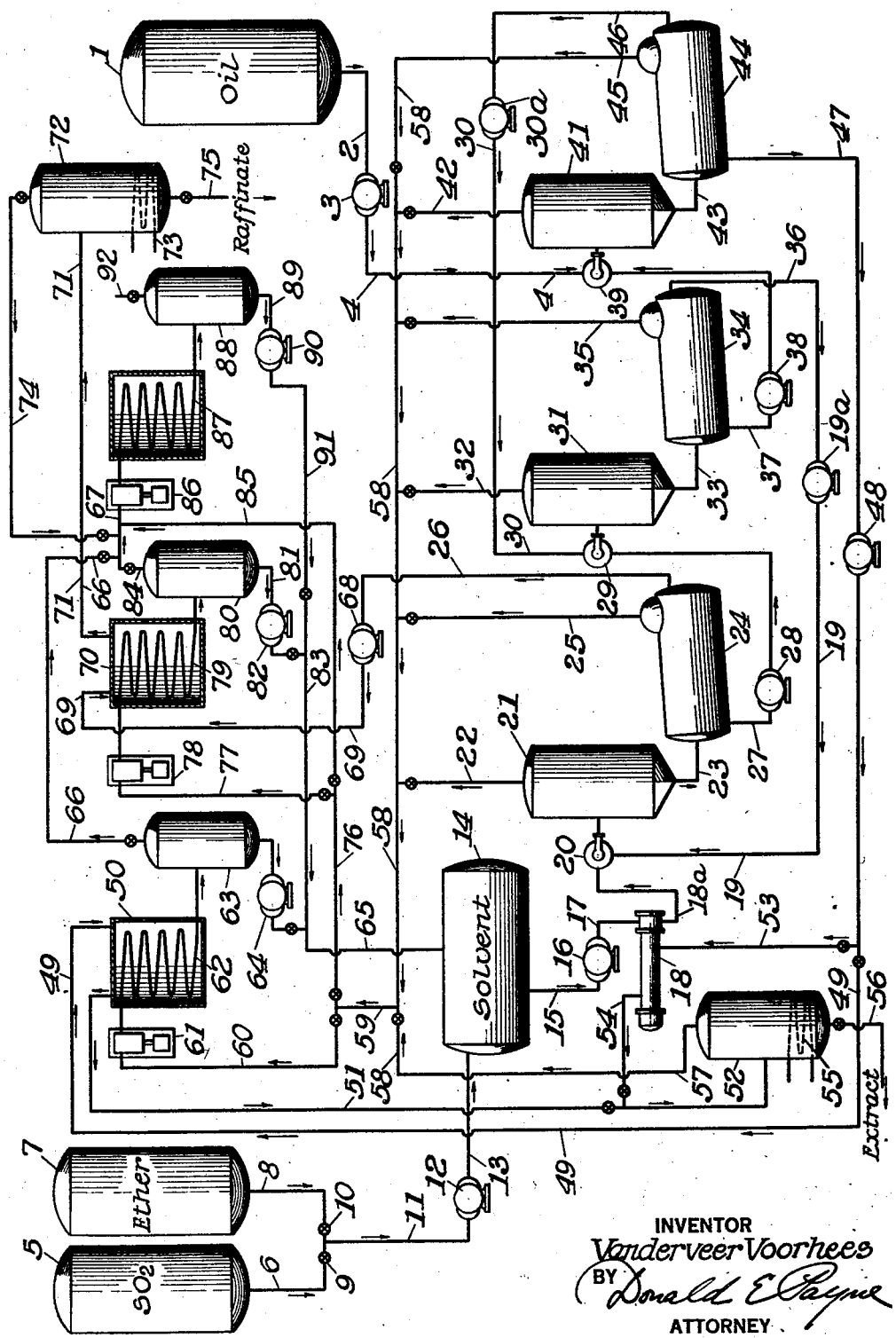

SOLVENT EXTRACTION

Vanderveer Voorhees, Hammond, Ind., assignor to Standard Oil Company, Chicago, Ill., a corporation of Indiana Application April 24, 1933, Serial No. 667,574

7 Claims. (Cl. 196—13)

This invention relates to solvent extraction and it pertains more particularly to the separation of so-called naphthenic from paraffinic components of petroleum hydrocarbons.

The object of my invention is to improve the sulfur dioxide extraction processes heretofore known. Sulfur dioxide is not miscible with oil to a very great extent and to obtain large yields of extracts it is necessary to add benzol or the like. Sulfur dioxide, being extremely polar, requires the use of a common solvent for obtaining intimate contact, large extract yields and highly paraffinic raffinates. The object of my invention is to provide a mixture of sulfur dioxide with a solvent which has these properties and which at the same time has approximately the same boiling point as the $SO_2$. Unless the added solvent has about the same boiling point as the $SO_2$, large and expensive equipment is required for fractionation, and the process is further complicated by changes in solvent ratios if there is any vaporization, particularly when vaporization is employed to effect auto-refrigeration. The object of my invention then is to provide a mixed solvent which will have the properties of a single solvent and which will be more selective, more efficient and more adaptable to petroleum refining than any solvents heretofore known. A further object is to provide an improved operating system, the details of which will be hereinafter set forth.

In practicing my invention I prefer to employ a mixture of sulfur dioxide with dimethyl ether. I may use the proportions of 1:1 of these solvents or I may vary the proportions through wide limits. By increasing the amount of ether I increase the amount of material extracted by the solvent and increase the paraffinicity of the raffinate. The amount of extract and the paraffinicity of the raffinate will depend, of course, on the nature of the oil which is being extracted because obviously it is impossible to obtain more paraffinic constituents than were originally present in the oil.

The invention is applicable to the preparation of lubricating oils from heavy petroleum distillates because the improved action of my solvent makes it possible to obtain a higher viscosity index (Davis, Lapeyrouse & Dean—Chem. & Met. Eng. March 31, 1932, page 92) better temperature viscosity characteristics and higher quality oils than could be obtained by either of the solvents alone. In addition to the treatment of lubricating oils, the invention is applicable to the extraction of kerosenes because it removes the "smoky hydrocarbons" and improves the burning qualities of the oil. The invention may also be used in the solvent extraction of naphthas and gasolines because it furnishes a means whereby I may separate the high antiknock components from the low antiknock components. In the case of gasoline the separation of the solvent from the finished products is an important consideration, and I find that the $SO_2$-dimethyl ether mixture, may be readily fractionated from the lighter gasolines. The extract produced by the solvent extraction of naphtha may be used directly for blending to form premium high-antiknock motor fuels, or it may be diluted, acid treated, clayed, treated with doctor and/or further stabilized against oxidation, sludge formation and color instability by the addition of inhibitors or antioxidants. The raffinate in the case of naphtha extraction may be cracked or re-formed for improving its knock rating so that it may also be employed as a motor fuel.

The invention will be more readily understood from the accompanying drawing forming a part of this specification, and which represents a diagrammatic elevational diagram of my improved system.

The invention will be described as applied to the extraction of motor oil but it will be understood that it is applicable to any petroleum product. With some lubricating oils it may be necessary to dewax the oils before treating and/or to employ a suitable diluent. Likewise, centrifuges could be employed instead of horizontal settling tanks. Such expedients will be familiar to those skilled in the art. For instance, I may use the dimethyl ether as a dewaxing diluent, and later add the sulfur dioxide for the extraction step. I may also vary the proportion of the solvents in the different stages.

The raw or unextracted oil which may be a Mid-Continent distillate of about 350–850 seconds Saybolt viscosity at 100° F. is introduced into the system from storage tank 1 through pipe 2, pump 3, and pipe 4 to the last step of a countercurrent extraction system, as will be hereinafter described. Sulfur dioxide from storage tank 5 and pipe 6 is mixed with dimethyl ether from storage tank 7 and pipe 8 in amounts regulated by valves 9 and 10. Some heat is evolved on mixing and this may be removed by coolers. The mixture is conveyed by means of pipe 11, pump 12 and pipe 13 to solvent supply tank 14. In a preferred embodiment, two or three volumes of $SO_2$ are used per volume of dimethyl ether.

Solvent is transferred from the base of supply tank 14 through pipe 15 by pump 16, which forces it through pipe 17, heat exchanger 18 and pipe 18a to mixer 20 wherein it is mixed with raffinate from a prior extraction stage introduced by pipe 19. The temperature of the mixture is preferably about 30° F., and to effect intimate contact I prefer to pass the mixture through the orifice mixer 20 before introducing it into chill chamber 21. In the chill chamber further cooling may be effected by removing solvent vapors through pipe 22, the mixture which is cooled to about 10° F. being transferred by pipe 23 to settling tank 24. Enough vaporization may take place in tank 24 to maintain the low temperature and compensate for radiation losses, vapors being removed through pipe 25, but the vaporization should not be sufficient to cause agitation and prevent the separation of the solution into raffinate and extract phases. The raffinate from settling tank 24 is passed by pipe 26 to a suitable solvent recovery system hereinafter described and the extract is passed by pipe 27 through pump 28 to mixer 29 wherein it is intimately mixed with the raffinate from a subsequent extraction step, said raffinate being introduced to the mixer through pipe 30 and the mixture being introduced into chill chamber 31. Here the temperature may be further reduced, say to −10° F., by further vaporization of the solvent, the vapors being withdrawn through pipe 32. The cooled mixture is introduced by pipe 33 to the second settling tank 34, from which vapors may be removed through pipe 35. The raffinate from settling tank 34 is passed by pipe 36 and pump 19a to pipe 19, where it is mixed with fresh solvent in the first extraction step hereinabove described. The extract is passed by pipe 37 and pump 38 to mixer 39 wherein it is mixed with fresh oil from pipe 4, the mixture being introduced into chiller 41. Here the temperature may be lowered to −30° F. by further removal of solvent vapors through pipe 42, the chilled liquid being transferred through pipe 43 to the third settling tank 44, from which vapors may be removed through pipe 45. The raffinate from settling tank 44 is passed through pipe 46 and pump 30a to pipe 30 for admixture with the solvent and extract from the first extraction step. The extract from settling tank 44 is withdrawn through pipe 47 and forced by pump 48 either through pipe 49, condenser box 50 and pipe 51 to stripper 52, or through pipe 53, heat exchanger 18 and pipe 54 to said stripper. The stripper is provided with steam coil 55 at the base thereof, and the final extract is withdrawn from the base of the stripper through pipe 56. If desired, stripper 52 may be preceded by a stripper operated at elevated pressure sufficient to condense the solvent in a water cooled coil, thus reducing cost of solvent compression and recovery. The extract is a sticky viscous oil unsuited for lubricating purposes but suitable for asphalt manufacture, fuel, etc.

Solvent vapors from the top of stripper 52 are conducted by pipe 57 to solvent gas main 58 into which pipes 22, 25, 32, 35, 42, and 45 are connected. The solvent vapors from this main are conducted by pipe 59 through one of two systems. They may pass through pipe 60, compressor 61 and condenser coil 62 into separator 63, from which the liquefied solvent is returned to the supply tank 14 by pump 64 and line 65. In this case the uncondensed solvent vapors withdrawn from the top of separator 63 are conveyed by pipe 66 to a lower pressure gas main 67.

The final raffinate from settling tank 24 is pumped through pipe 26, pump 68, pipe 69, condenser box 70 and pipe 71 into stripper 72. A steam coil 73 removes all traces of solvent from the oil, the solvent being withdrawn through pipe 74 to the low pressure gas main 67. The finished raffinate is withdrawn from the base of stripper 72 through pipe 75. It is an excellent lubricating oil and may have a viscosity index of 80 to above 100 if prepared from a Mid-Continent or other mixed base oil. It may be further reformed with acid, fuller's earth, etc.

Returning to solvent gas main 58, the gas from this main or a part thereof may be passed through pipe 76 directly to gas main 67. On the other hand it may be passed through pipe 77, compressor 78, condenser coil 79 and separator tank 80, from which condensed solvent is returned by pipe 81, pump 82 and pipe 83 through pipe 65 to solvent supply tank 14. Vapors from the top of separator tank 80 likewise discharge into gas main 67.

All of the gases from main 67 are compressed by compressor 86 and forced through condenser coil 87 into separator 88, the last traces of solvent being liquefied and returned through pipe 89, pump 90 and pipes 91, 83 and 65 to solvent supply tank 14. Gas leaving the top of separator 88 through pipe 92 may be scrubbed with incoming oil for the absorption therefrom of any solvent which may remain unliquefied.

While I have described a preferred embodiment of my invention it should be understood that I do not limit myself to any of the above details except as defined by the following claims, which should be construed as broadly as the prior art will permit. Other mechanical means may be employed for contacting the liquefied solvent with the oil which is undergoing treatment and for separating the phases which result therefrom. Instead of employing a countercurrent system in a plurality of tanks, I may employ a single vertical tower wherein the solvent mixture is caused to descend in small droplets thru an upwardly ascending column of oil undergoing extraction. Likewise, I may extract any given oil with additional amounts of pure solvent. I may also separate the solvent mixture, e. g.—$SO_2$—dimethylether, during recovery by the use of suitable fractionating means. In this case I may use part of the ether to sweep the final traces of $SO_2$ from the oil fractions before finally discharging them from the system. This operation may suitably be performed in vertical scrubbing towers at low pressure, and the vapors may pass to a recompression system similar to that illustrated in the drawing. These and many other expedients will be apparent to any one skilled in the art.

It should also be understood that instead of compressing and liquefying all of my solvent I may absorb it in the incoming oil which is to be extracted.

My improved solvent extraction process may, in the case of lubricating oils, be combined with dewaxing or treating processes, in which case I may use the auto refrigeration available by virtue of the normally gaseous liquefied solvent mixture, and I may utilize the diluent effect of the solvent which is accentuated by the presence of the dimethyl ether. My invention is chiefly directed, however, to the solvent extraction process and particularly to the use of the solvent mixture therefor as hereinabove described.

I claim:

1. The process of separating liquid paraffinic components from naphthenic components of hydrocarbon oils which comprises admixing with hydrocarbon oils a mixture of sulfur dioxide and dimethyl ether, effecting a separation of a raffinate phase from an extract-solvent phase, and recovering the sulfur dioxide and the dimethyl ether from each phase.

2. The process of claim 1 wherein the mixture of sulfur dioxide and dimethyl ether is handled throughout the system as a simple solvent, and wherein the sulfur dioxide is not separated from the dimethyl ether.

3. The method of converting naphtha into high antiknock motor fuel which comprises admixing it with a mixture of sulfur dioxide and dimethyl ether, separating a raffinate phase from an extract-solvent phase, and recovering the solvent from said last named phase.

4. The process of improving the viscosity index of mineral lubricating oil distillates containing liquid paraffinic and naphthenic components comprising extracting the distillate with a solvent composed of a mixture of liquid sulfur dioxide and liquid dimethyl ether in the proportion of two to three volumes of sulfur dioxide to one volume of dimethyl ether.

5. The process of claim 4 wherein the extraction is performed at superatmospheric pressure and at a temperature above the boiling point of dimethyl ether, and the solvents are recovered by distillation and reused without separation, one from the other.

6. The process of claim 3 wherein the solvent mixture of sulfur dioxide and dimethyl ether is recovered from both the raffinate phase and the extract phase and re-employed in the process.

7. The method of converting naphtha into high antiknock motor fuel which comprises separating the high antiknock constituents thereof from low antiknock constituents by extraction with a mixture of liquid sulfur dioxide and liquid dimethyl ether and subsequently converting said low antiknock constituents into high antiknock motor fuels by subjecting them to cracking.

VANDERVEER VOORHEES.